United States Patent [19]
Kitaguchi et al.

[11] Patent Number: 5,717,080
[45] Date of Patent: Feb. 10, 1998

[54] BIS-AZO COMPOUNDS WITH 2,3-DICHLOROBENZOYL GROUP

[75] Inventors: Hiroshi Kitaguchi; Hideaki Satoh; Shigeru Yamazaki; Hideto Mori; Naoyuki Nishikawa; Tomohiro Ogawa, all of Minami-ashigara; Hai-jian Xu, Hiratsuka; Tadahiko Izushi, Minami-ashigara, all of Japan

[73] Assignee: Fuji Immunopharmaceuticals Corp., Lexington, Mass.

[21] Appl. No.: 702,583

[22] PCT Filed: Feb. 13, 1995

[86] PCT No.: PCT/JP95/00193

§ 371 Date: Aug. 20, 1996

§ 102(e) Date: Aug. 20, 1996

[87] PCT Pub. No.: WO95/23189

PCT Pub. Date: Aug. 31, 1995

[30] Foreign Application Priority Data

Feb. 23, 1994 [JP] Japan .................. 6-025581

[51] Int. Cl.$^6$ .................. C09B 31/057; C09B 31/068; C09B 33/10; C09B 35/029
[52] U.S. Cl. .................. 534/830; 534/849
[58] Field of Search .................. 534/830

[56] References Cited

U.S. PATENT DOCUMENTS

| | | | |
|---|---|---|---|
| 3,671,253 | 6/1972 | Froelich et al. | 534/830 X |
| 3,754,923 | 8/1973 | Stauner et al. | 534/830 X |

FOREIGN PATENT DOCUMENTS

| | | |
|---|---|---|
| 49-37853 | 10/1974 | Japan . |
| 60-223877 | 11/1985 | Japan . |
| 2-29603 | 1/1990 | Japan . |

*Primary Examiner*—Floyd D. Higel
*Attorney, Agent, or Firm*—Sughrue, Mion, Zinn, Macpeak & Seas, PLLC

[57] ABSTRACT

A bis-azo compound represented by the following general formula (1), a tautomer thereof or a salt thereof:

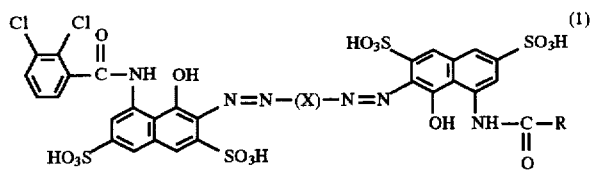

wherein R represents a substituted or unsubstituted phenyl group or a substituted or unsubstituted heteroaryl group and X represents a substituted or unsubstituted phenylene group. These compounds exhibit low toxicity and do not have any undesirable effect such as mutagenecity.

8 Claims, No Drawings

BIS-AZO COMPOUNDS WITH 2,3-DICHLOROBENZOYL GROUP

TECHNICAL FIELD

The present invention relates to a novel bis-azo compound.

BACKGROUND ART

It has been known that azo compounds have wide variety of uses in, for instance, dyes, dyestuffs for printing, food colors, liquid crystals and drugs. Among these, bis-azo compounds each having two azo bonds in the molecule are compounds which have generally been known as dyes, in particular, photographic light-sensitive materials used in the silver dye bleach process (see, for instance, U.S. Pat. Nos. 3,754,923 and 3,671,253). Bis-azo compounds used as photographic light-sensitive materials are characterized in that they have, in combination, hydrophilic groups (more specifically, a plurality of, for instance, sulfonate residues) for imparting moderate solubility in water to the molecules and hydrophobic groups and a molecular weight required for rendering the molecules uniformly dispersible in emulsions.

Such compounds should have toxicity as low as possible and should not have undesirable properties such as mutagenicity. However, the studies of the inventors of this invention and recent studies (Mutation Research, 1992, 277, p. 201) make it clear that most of the conventionally known bis-azo compounds show mutagenicity. For this reason, there has been desired for the development of compounds which are much safer and more useful in this regard.

DISCLOSURE OF THE INVENTION

Accordingly, an object of the present invention is to provide a novel bis-azo compound which is free of any undesirable effect such as mutagenicity.

The inventors of this invention have conducted various studies to achieve the foregoing object and as a result, have found out that bis-azo compounds represented by the following general formula (1) or (2) whose acyl group attached to an amino group on an aminonaphthalenesulfonate moiety present in the compounds is modified have low toxicity and are free of such undesirable effects as mutagenicity and thus have completed the present invention.

In Formula (1), R represents a substituted or unsubstituted phenyl group or a substituted or unsubstituted heteroaryl group and X represents a substituted or unsubstituted phenylene group. In Formula (2), R represents a substituted or unsubstituted phenyl group or a substituted or unsubstituted heteroaryl group and A and B may be the same or different and each represents a group selected from the group consisting of hydrogen atom, alkyl groups having 1 to 4 carbon atoms, alkoxy groups having 1 to 4 carbon atoms and halogen atoms.

The present invention relates to a bis-azo compound which is characterized in that the N-acyl group present on 8-amino-1-hydroxynaphthalene-3,6-disulfonic acid is 2,3-dichlorobenzoyl group. Bis-azo compounds whose N-acyl group is p-chlorobenzoyl, m-chlorobenzoyl, 2,4-dichlorobenzoyl or 3,4-dichlorobenzoyl group are disclosed in the U.S. Patents listed above, but most of these compounds show mutagenicity.

Contrary to this, the bis-azo compound substituted with a 2,3-dichlorobenzoyl group and represented by the foregoing general formula (1) or (2) has substantially reduced mutagenicity.

If R represents a substituted phenyl group, examples of preferred substituents thereof are halogen atoms, trifluoromethyl group, alkyl groups, alkoxy groups, alkylcarbonyl groups, aryl groups, aryloxy groups, arylcarbonyl groups, cyano group and hydroxyl group, with halogen atoms such as fluorine or chlorine atom, trifluoromethyl group, cyano group, alkyl groups having 1 to 4 carbon atoms or alkoxy groups having 1 to 4 carbon atoms being more preferred as such a substituent. Among these, particularly preferred are halogen atoms, in particular, chlorine atom. Moreover, an unsubstituted phenyl group is likewise preferred as the substituent R.

If R represents a chlorine atom-substituted phenyl group, the preferred number of chlorine atoms present on the phenyl group ranges from 1 to 3 and preferably 1 or 2. If R is a monochloro-substituted phenyl group, the chlorine atom may be on either of o-, m- or p-position, in particular, o-position. If R is a dichloro-substituted phenyl group, preferred examples thereof are 2,4-dichlorophenyl, 3,4-dichlorophenyl, 2,3-dichlorophenyl and 2,5-dichlorophenyl groups, with 2,4-dichlorophenyl, 2,5-dichlorophenyl and 2,3-dichlorophenyl being more preferred and 2,4-dichlorophenyl being particularly preferred.

If the substituent R is a heteroaryl group, specific examples of heteroaryl groups include pyridyl group, thienyl group, furyl group, quinolyl group and isoquinolyl group. If the heteroaryl group has a substituent, examples of such substituents suitably include halogen atoms such as fluorine, chlorine, bromine and iodine atoms, trifluoromethyl group, alkyl groups, alkoxy groups, aryl groups, cyano group and

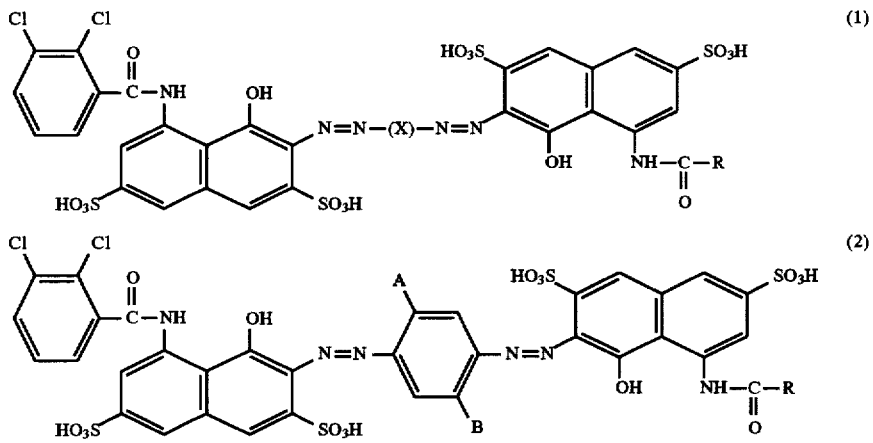

hydroxyl group, with halogen atoms such as fluorine and chlorine and alkyl groups having 1 to 4 carbon atoms being preferred.

If the substituent R represents a substituted or unsubstituted heteroaryl group, specific examples of R include 3-pyridyl, 4-pyridyl, 2-thienyl, 2-furyl and 3-quinolyl groups, with 3-pyridyl and 3-quinolyl groups being particularly preferred.

If X represents a substituted phenylene group, the substituents may be those listed above, as preferred substituents, in connection to the case wherein the substituent R is a phenyl group.

In the general formula (2), A and B may be the same or different and each represents a substituent selected from the group consisting of hydrogen atom, alkyl groups having 1 to 4 carbon atoms, alkoxy groups having 1 to 4 carbon atoms and halogen atoms. Preferred examples of alkyl groups are methyl, ethyl and butyl groups; preferred examples of alkoxy groups are methoxy, ethoxy and butoxy groups; and preferred halogen atoms are fluorine, chlorine and bromine atoms. Among these, preferred are alkyl groups and alkoxy groups, in particular, alkoxy groups.

A and B may be the same or different, but preferably they represent the same groups. Preferably, both A and B are alkoxy groups each having 1 to 4 carbon atoms and most preferably, both A and B are methoxy groups.

Preferred combinations of R, A and B in the compounds represented by the foregoing general formula (2) are listed in Table 1. Among these combinations, preferred are (a), (b), (c), (d), (e), (f), (g), (h), (i), (j), (k) and (o) and particularly preferred combinations thereof are (c), (d), (e), (f), (g), (h), (i), (j) and (k).

TABLE 1

| Combina-tion | Substituents | | |
|---|---|---|---|
| | R | A | B |
| (a) | phenyl group | methyl group | methyl group |
| (b) | phenyl group | methoxy group | methoxy group |
| (c) | monochlorophenyl group | methyl group | methyl group |
| (d) | monochlorophenyl group | methoxy group | methoxy group |
| (e) | monochlorophenyl group | ethoxy group | ethoxy group |
| (f) | dichlorophenyl group | methyl group | methyl group |
| (g) | dichlorophenyl group | methoxy group | methoxy group |
| (h) | dichlorophenyl group | ethoxy group | ethoxy group |
| (i) | dichlorophenyl group | hydrogen atom | hydrogen atom |
| (j) | dichlorophenyl group | halogen atom | hydrogen atom |
| (k) | dichlorophenyl group | methoxy group | methyl group |
| (l) | 3-pyridyl group | methyl group | methyl group |
| (m) | 3-pyridyl group | methoxy group | methoxy group |
| (n) | 3-quinolyl group | methyl group | methyl group |
| (o) | 3-quinolyl group | methoxy group | methoxy group |

The ionic group present in the bis-azo compound of the present invention may form a salt with an appropriate counterion, specifically a cation. The cation is preferably one which is substantially non-toxic and does not independently have significant pharmacological activity. Specific examples of such salts are alkali metal salts such as sodium and potassium salts, alkaline earth metal salts represented by magnesium salt, salts with light metals of Group IIIA including aluminum, ammonium salts, and salts with organic primary, secondary and tertiary amines. Among these salts, particularly preferred are sodium, potassium, ammonium salts and organic amine salts. Preferred examples of organic amines are triethylamine, tris(hydroxymethyl)aminomethane, and derivatives of amino acids and oligopeptides.

Alternatively, the bis-azo compounds of the present invention may also be used in the form of pharmaceutically unacceptable salts depending on the applications thereof. Examples of such salts include those containing barium, titanium, and zinc.

The method for synthesizing the bis-azo compounds of the present invention will now be described below. The compounds represented by the foregoing general formula (2) can easily be prepared from known starting materials or intermediates according to methods almost similar to those disclosed in U.S. Pat. Nos. 3,754,923 and 3,671,253 or those disclosed in published volumes [for instance, Yutaka HOSODA, "Riron Seizo Senryo Kagaku (Theoretical Manufacture and Chemistry of Dyes)", Gihodo Publishing Company].

For instance, the compounds represented by the foregoing general formula (2) can be prepared by first coupling a compound represented by the following intermediate I with a diazonium salt prepared from a compound represented by the following general formula (3) (in Formula (3), A and B are the same as those defined above) to form a monoazo compound represented by the following general formula (4) (in Formula (4), A and B are the same as those defined above), then converting the monoazo compound into an amine derivative thereof represented by the following general formula (5) (wherein A and B are the same as those defined above) through reduction of the nitro group present in the compound, finally coupling a diazonium salt prepared from the amine derivative with a compound represented by the following general formula (6) (wherein the formula R is the same as that defined above), and optionally salting out the resulting reaction system and filtering off the precipitations thus formed.

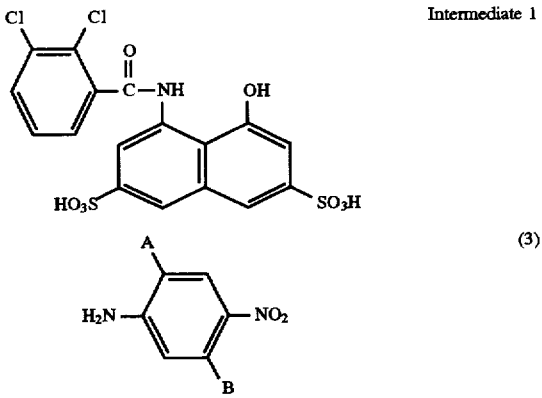

Intermediate 1

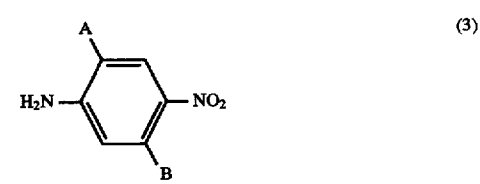

(3)

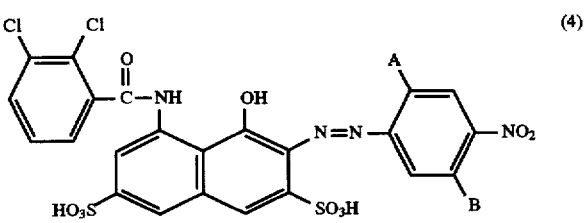

(4)

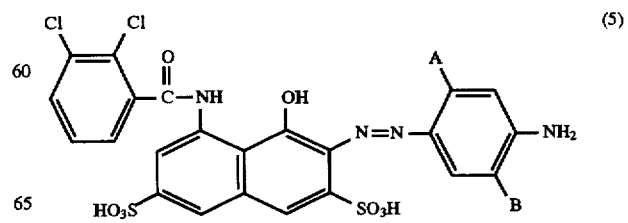

(5)

-continued

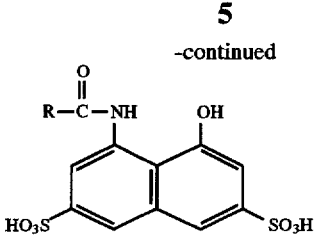

(6)

In the series of steps described above, the first coupling step and the reducing step may be carried out in succession without isolating the nitro derivative represented by Formula (4). There is no doubt that the compounds represented by Formula (2) may likewise be prepared by changing the order of the coupling reactions, i.e., by first coupling the diazonium salt prepared from the compound represented by Formula (3) with the compound represented by Formula (6), then reducing the nitro group present in the resulting product, converting it into a diazonium salt, and coupling the diazonium salt with the intermediate 1. In the foregoing description of the production method, the sulfonate residue is expressed in terms of its free acid form, but the compounds whose sulfonate residues are in the form of salts with appropriate counterions may be used in the foregoing reaction to thus isolate intended bis-azo compounds. In this case, it is preferred that these compounds are reacted in the form of sodium salts and then intended bis-azo compounds are isolated, because of easy availability of starting materials and reagents to be used. In addition, if it is needed to prepare a salt of the desired bis-azo compound with a counterion other than sodium ion, it can be prepared by ion-exchanging the corresponding sodium salt.

Specific examples of the bis-azo compounds of the present invention will be listed below (expressed in terms of sodium salts except for Compounds 11 and 12), but the present invention is not restricted to these specific examples.

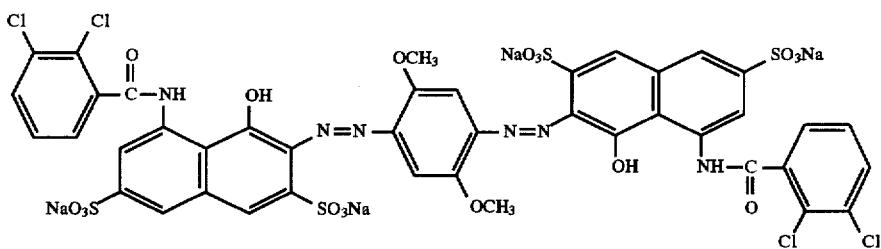

Compound 1

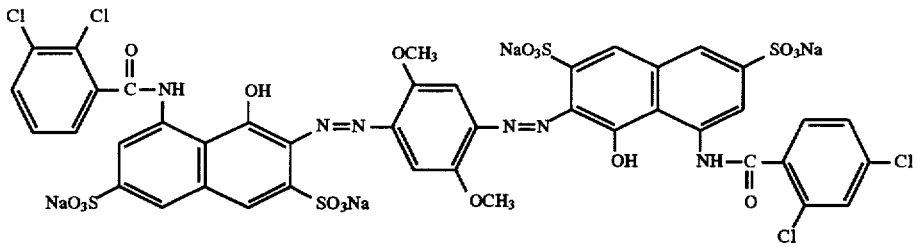

Compound 2

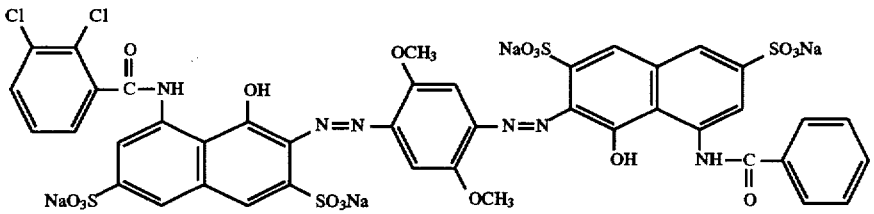

Compound 3

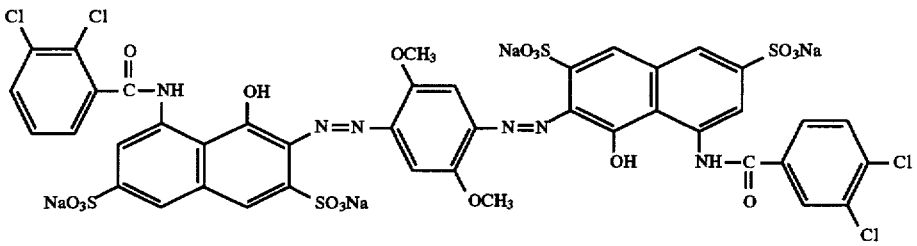

Compound 4

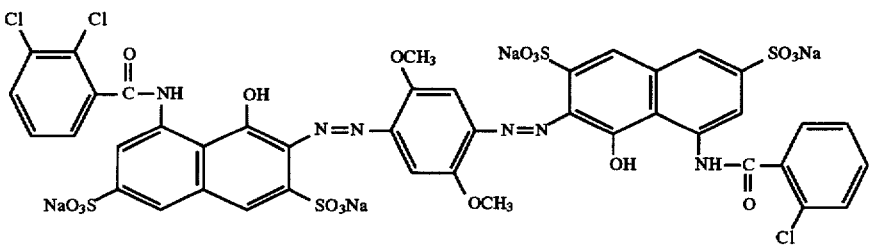

Compound 5

-continued
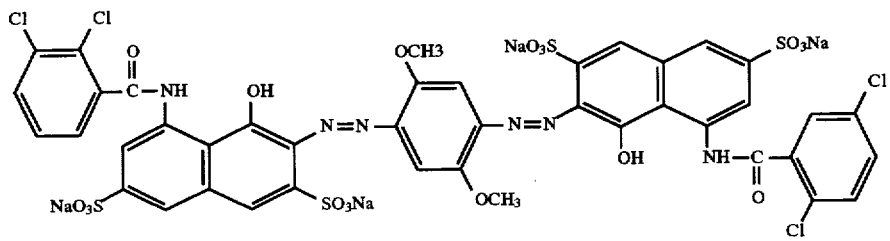
Compound 6
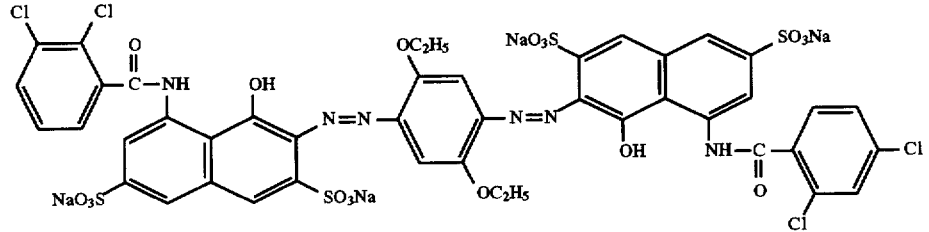
Compound 7
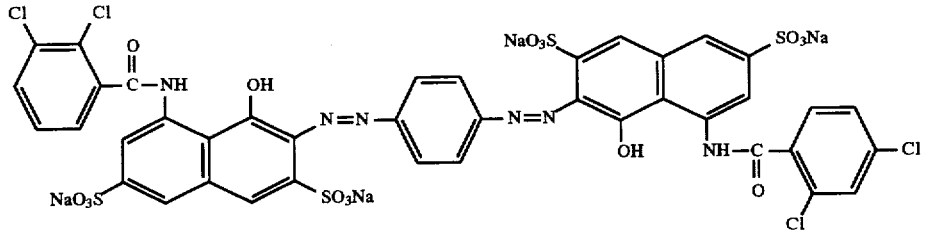
Compound 8
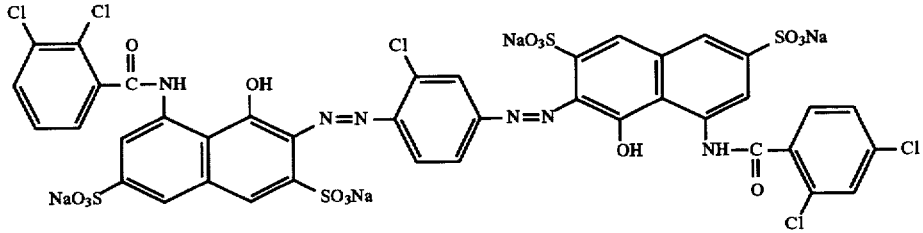
Compound 9
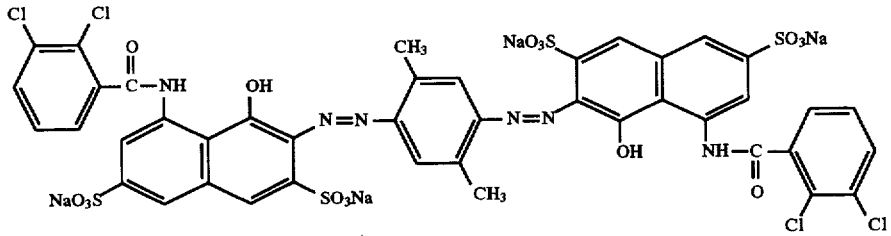
Compound 10
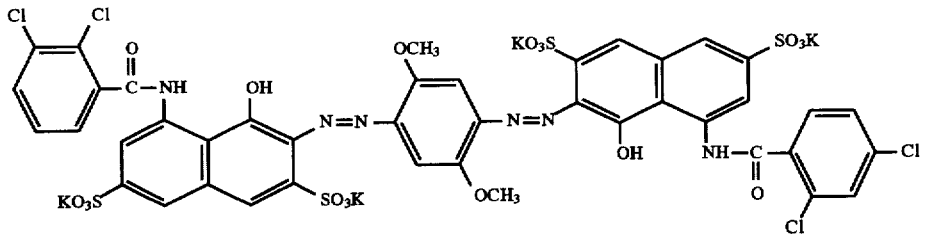
Compound 11

Compound 12

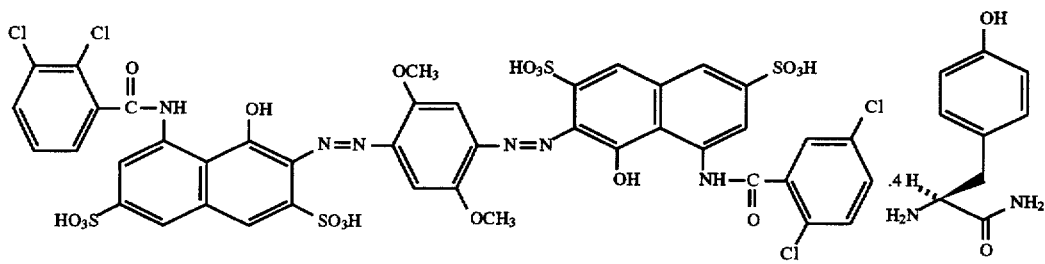

The present invention will hereinafter be described in more detail with reference to the following Examples.

EXAMPLE 1

Synthesis of Compound 1

The method for synthesizing Compound 1 will be detailed below. The route of synthesis of Compound 1 is as follows:

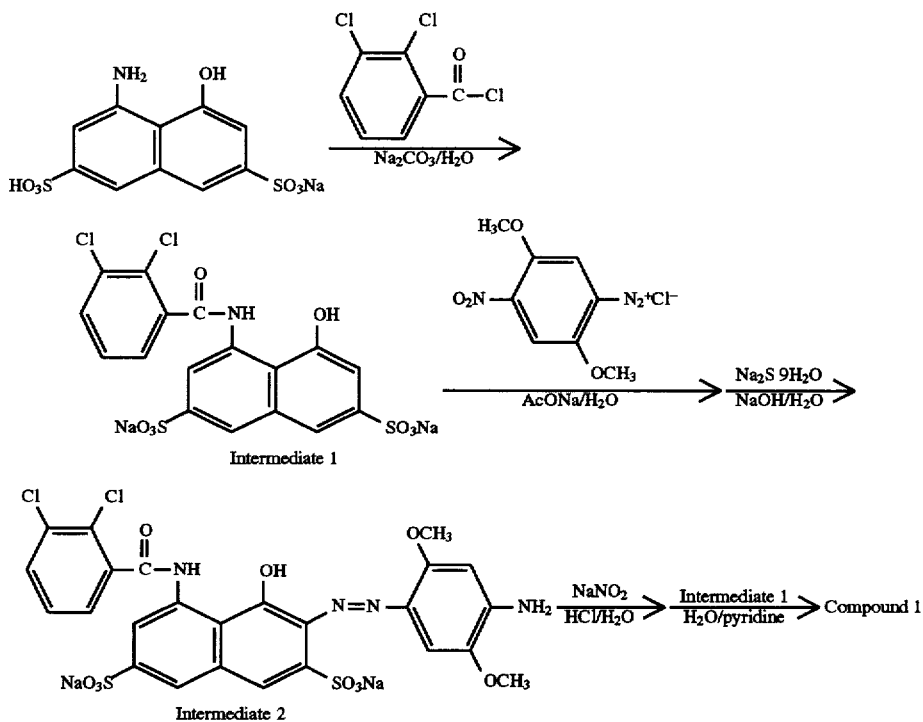

1) Synthesis of Intermediate 1

The intermediate was prepared by an improved Schotten-Baumann method. More specifically, 8-amino-3,6-disulfo-1-naphthol (H-acid, 34.2 g; 100 mmol as expressed in terms of monosodium salt), sodium hydroxide (5.0 g, 125 mmol) and sodium carbonate (37.0 g, 350 mmol) were dissolved in deionized water (200 ml) and a solution of 2,3-dichlorobenzoyl chloride (23.1 g, 110 mmol) in THF (20 ml) was dropwise added to the resulting solution at 35° to 40° C. for about one hour while blowing nitrogen gas through the solution. The reaction mixture was vigorously stirred at that temperature for one hour, then the temperature of the mixture was raised up to 80° C. and the mixture was again vigorously stirred for one hour. After addition of 250 ml of a 10% aqueous common salt solution to the mixture and allowing it to cool down to room temperature, the precipitates formed were collected through filtration, followed by washing the precipitates with a 10% aqueous common salt solution and acetonitrile in this order and then drying to give 40.0 g of the desired intermediate 1 (yield 75% as calculated on the basis of the disodium salt thereof).

2) Synthesis of Intermediate 2

There was dissolved 2,5-dimethoxy-4-nitroaniline (4 g, 20 mmol) in a mixed solution comprising deionized water (20 ml) and concentrated hydrochloric acid (5.1 ml) and then a solution of sodium nitrite (1.56 g, 22 mmol) in deionized water (10 ml) was added to the resulting solution while ice-cooling the latter. The reaction mixture was stirred for 60 minutes with ice-cooling. The aqueous solution of the diazonium salt thus prepared was added to a solution (200 ml) of Intermediate 1 (12 g, 22.2 mmol as calculated on the basis of its disodium salt form) and sodium acetate (5.5 g) in deionized water at 10° C. After stirring the reaction mixture at 20° C. for one hour, it was heated to 45° C. and further stirred for additional one hour.

To the reaction mixture, therewere, in order, added a 20% aqueous solution of sodium hydroxide (9 ml) and then sodium sulfide nonahydrate (19.2 g, 80 mmol), followed by stirring at 45° C. for one hour. After the completion of the stirring operation, isopropyl alcohol (50 ml) was added to the reaction mixture and then the reaction mixture was neutralized by the addition of acetic acid (9 ml) to thus give precipitates. Further a saturated sodium acetate aqueous solution (30 ml) was added to the reaction system, followed by recovering the precipitates thus formed through filtration and washing the precipitates with a mixed solvent of a 10% aqueous sodium acetate solution and isopropyl alcohol (volume ratio 1:1) and then isopropyl alcohol.

The crude product of Intermediate 2 thus prepared was suspended in a mixed solvent comprising toluene (160 ml) and isopropyl alcohol (40 ml) and then vigorously stirred under reflux. After the stirring operation under reflux, the precipitates were collected through filtration, followed by washing with a mixed solvent of toluene and isopropyl alcohol (volume ratio 4:1) and drying to give 12.2 g of the desired Intermediate 2 (yield 84%, as calculated on the basis of the disodium salt thereof).

3) Synthesis of Compound 1

A solution of Intermediate 2 (5 g, 7.0 mmol) in deionized water (70 ml) was ice-cooled, followed by addition of concentrated hydrochloric acid (1.75 ml), vigorous stirring, addition of a solution of sodium nitrite (588 mg, 8.4 mmol) in deionized water (5 ml) and stirring the mixture for 60 minutes with ice-cooling to give a diazonium salt. On the other hand, Intermediate 1 (4.5 g, 8.4 mmol) was dissolved in deionized water (30 ml), followed by addition of pyridine (15 ml) and then addition of a suspension of the diazonium salt prepared by the foregoing procedures at a temperature ranging from 10° to 15° C. The reaction mixture was stirred at room temperature for 60 minutes, then heated up to 50° C. and again stirred for additional 30 minutes. Then the reaction mixture was heated to 70° C., followed by addition of isopropyl alcohol (100 ml) and a saturated aqueous solution of sodium acetate (40 ml). After cooling down to 40° C., the precipitates thus formed were collected through filtration, followed by washing with a 10% aqueous sodium acetate solution, a mixed solvent of isopropyl alcohol and water (volume ratio 4:1) and isopropyl alcohol in this order and drying them.

The crude product of Compound 1 thus prepared was dissolved in 80 ml of water at 80° C. and then isopropyl alcohol (320 ml) was dropwise added to the resulting solution at 70° C. with stirring. The mixture was cooled to 50° C., followed by collection of the resulting precipitates through filtration, washing them with a mixed solvent of isopropyl alcohol and water (volume ratio 4:1) and isopropyl alcohol in this order and drying the precipitates to give 4.95 g (3.92 mmol, 56%) of Compound 1.

EXAMPLE 2

Synthesis of Compound 2

The method for synthesizing Compound 2 will be detailed below. The route of synthesis of Compound 2 is as follows:

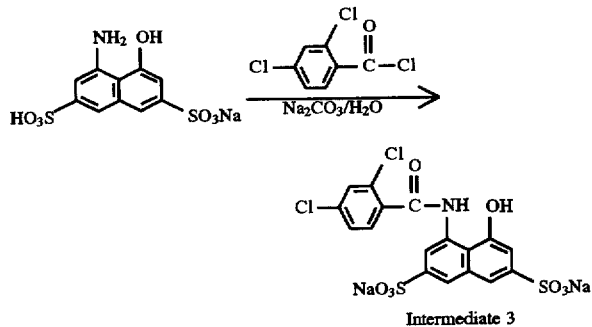

Intermediate 3

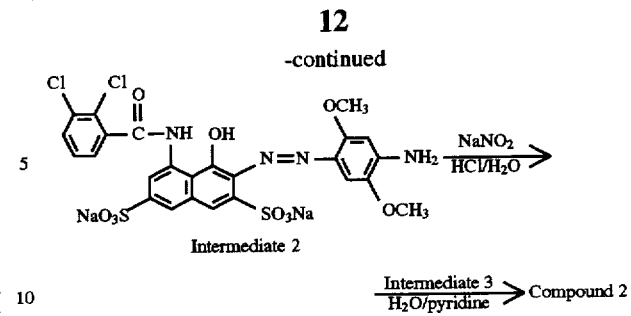

Intermediate 2

Intermediate 3 / H₂O/pyridine → Compound 2

1) Synthesis of Intermediate 3

The intermediate was prepared by an improved Schotten-Baumann method. More specifically, 8-amino-3,6-disulfo-1-naphthol (H-acid, 68.2 g; 200 mmol as calculated on the basis of its monosodium salt), sodium hydroxide (8.6 g, 140 mmol) and sodium carbonate (12.7 g, 120 mmol) were dissolved in deionized water (400 ml) and 2,4-dichlorobenzoyl chloride (46.1 g, 220 mmol) was dropwise added to the resulting solution at 38° to 44° C. for about one hour while blowing nitrogen gas through the solution. The reaction mixture was vigorously stirred at that temperature for one hour, then the temperature of the mixture was raised up to 80° C. and the mixture was again vigorously stirred for one hour. After addition of 80 ml of a 10% aqueous common salt solution to the mixture and allowing it to cool down to 35° C., the precipitates formed were collected through filtration, followed by washing the precipitates with a 10% aqueous common salt solution and acetonitrile in this order and then drying to give 82 g of the desired intermediate 3 (yield 77% as calculated on the basis of its disodium salt).

2) Synthesis of Compound 2

A solution of Intermediate 2 (10 g, 14 mmol) in deionized water (120 ml) was ice-cooled, followed by addition of concentrated hydrochloric acid (3.5 ml), vigorous stirring, addition of a solution of sodium nitrite (1.18 g, 17 mmol) in deionized water (10 ml) and stirring the mixture for 60 minutes with ice-cooling to give a diazonium salt. On the other hand, Intermediate 3 (9 g, 16.8 mmol) was dissolved in deionized water (60 ml), followed by addition of pyridine (30 ml) and then addition of a suspension of the diazonium salt prepared by the foregoing procedures at a temperature ranging from 10° to 15° C. The reaction mixture was stirred at room temperature for 60 minutes, then heated up to 50° C. and again stirred for additional 30 minutes. Then the reaction mixture was heated to 70° C., followed by addition of isopropyl alcohol (200 ml) and a saturated aqueous solution of sodium acetate (60 ml). After cooling down to 50° C., the precipitates thus formed were collected through filtration, followed by washing with a 10% aqueous sodium acetate solution, a mixed solvent of isopropyl alcohol and water (volume ratio 4:1) and isopropyl alcohol in this order and drying them.

The crude product of Compound 2 thus prepared was dissolved in 150 ml of water at 80° C. and then isopropyl alcohol (600 ml) was dropwise added to the resulting solution at 70° C. with stirring. The mixture was cooled to 50° C., followed by collection of the resulting precipitates through filtration, washing them with a mixed solvent of isopropyl alcohol and water (volume ratio 4:1) and isopropyl alcohol in this order and drying to give 9.5 g (7.5 mmol, 54%) of Compound 2.

EXAMPLE 3

Synthesis of Compound 4

1) Synthesis of Intermediate 4

The following Intermediate 4 was quantitatively prepared by repeating the same procedures used in the synthesis of Intermediate 1 in Example 1 except that 3,4-dichlorobenzoyl chloride was substituted for 2,3-dichlorobenzoyl chloride:

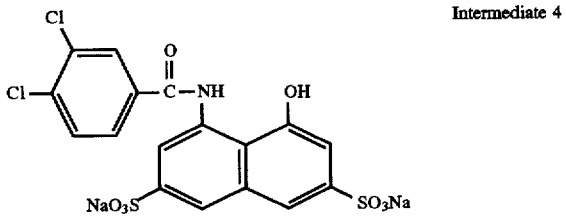

Intermediate 4

2) Synthesis of Compound 4

A solution of Intermediate 2 (3 g, 4.2 mmol) in deionized water (40 ml) was ice-cooled, followed by addition of concentrated hydrochloric acid (1.05 ml), vigorous stirring, addition of a solution of sodium nitrite (350 mg, 5.1 mmol) in deionized water (5 ml) and stirring the mixture for 60 minutes with ice-cooling to give a diazonium salt. On the other hand, Intermediate 4 (2.7 g, 5 mmol) was dissolved in deionized water (20 ml), followed by addition of pyridine (15 ml) and then addition of a suspension of the diazonium salt prepared by the foregoing procedures at a temperature ranging from 10° to 15° C. The reaction mixture was stirred at room temperature for 60 minutes, then heated up to 50° C. and again stirred for additional 30 minutes. Then the reaction mixture was heated to 70° C., followed by addition of isopropyl alcohol (100 ml) and sodium acetate (6 g). After cooling down to 40° C., the precipitates thus formed were collected through filtration, followed by washing with a 10% aqueous sodium acetate solution, a mixed solvent of isopropyl alcohol and water (volume ratio 4:1) and isopropyl alcohol in this order and drying them.

The crude product of Compound 4 thus prepared was dissolved in 130 ml of water at 80° C. and then isopropyl alcohol (300 ml) was dropwise added to the resulting solution at 70° C. with stirring. The mixture was cooled to 50° C., followed by collection of the resulting precipitates through filtration, washing them with a mixed solvent of isopropyl alcohol and water (volume ratio 4:1) and isopropyl alcohol in this order and drying to give 2.7 g (2.14 mmol, yield 51%) of Compound 4.

EXAMPLE 4

Synthesis of Compound 5

1) Synthesis of Intermediate 5

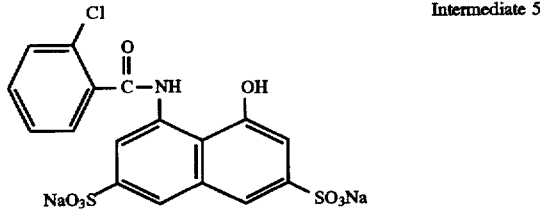

Intermediate 5

The intermediate was prepared by an improved Schotten-Baumann method. More specifically, 8-amino-3,6-disulfo-1-naphthol (H-acid, 51.2 g; 150 mmol as calculated on the basis of its monosodium salt), sodium hydroxide (7.5 g, 188 mmol) and sodium carbonate (10.6 g, 120 mmol) were dissolved in deionized water (300 ml) and o-chlorobenzoyl chloride (29 g, 165 mmol) was dropwise added to the resulting solution at 35° to 40° C. for about one hour while blowing nitrogen gas through the solution. The reaction mixture was vigorously stirred at that temperature for one hour, then the temperature of the mixture was raised up to 80° C. and the mixture was again vigorously stirred for one hour. Then 3 g of sodium carbonate was added to the mixture and the resulting mixture was stirred at 80° C. for 30 minutes. After addition of 300 ml of a 10% aqueous common salt solution to the mixture and addition of concentrated hydrochloric acid till the pH value of the reaction solution reached 4, the solution was cooled down to 35° C., the precipitates formed were collected through filtration, followed by washing the precipitates with a 10% aqueous common salt solution and acetonitrile in this order and then drying to give 68.3 g of the desired intermediate 5 (yield 91% as calculated on the basis of its disodium salt).

2) Synthesis of Compound 5

The same reaction used in the synthesis of Compound 1 was repeated except that Intermediate 5 was substituted for Intermediate 1 in the final step to thus form Compound 5 in a yield of 53%.

EXAMPLE 5

Synthesis of Compound 3

The same reaction used in the synthesis of Compound 1 was repeated except that commercially available N-benzoyl H-acid was substituted for Intermediate 1 in the final step to thus form Compound 3 in a yield of 58%.

EXAMPLE 6

Synthesis of Compound 6

1) Synthesis of Intermediate 6

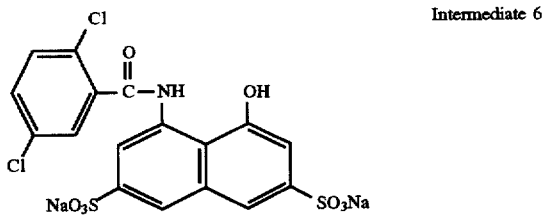

Intermediate 6

The intermediate was prepared by an improved Schotten-Baumann method. More specifically, 8-amino-3,6-disulfo-1-naphthol (H-acid, 31.2 g; 91 mmol as calculated on the basis of its monosodium salt), sodium hydroxide (4.5 g, 110 mmol) and sodium carbonate (7 g, 66 mmol) were dissolved in deionized water (200 ml) and a solution of 2,5-dichlorobenzoyl chloride (this was prepared by reacting 22 g of 2,5-dichlorobenzoic acid with 100 ml of thionyl chloride and then distilling off the excess thionyl chloride under reduced pressure) in THF (40 ml) was dropwise added to the resulting solution at 35° to 40° C. for about one hour while blowing nitrogen gas through the solution. The reaction mixture was vigorously stirred at that temperature for one hour, then the temperature of the mixture was raised up to 80° C. and the mixture was again vigorously stirred for one hour. After addition of 200 ml of a 10% aqueous common salt solution to the mixture and addition of concentrated hydrochloric acid till the pH value of the reaction solution reached 5, the solution was cooled down to 20° C., the precipitates formed were collected through filtration, followed by washing the precipitates with a 10% aqueous common salt solution and acetonitrile in this order and then drying to give 48 g of the desired intermediate 6 (yield 98%, as calculated on the basis of its disodium salt).

2) Synthesis of Compound 6

The same reaction used in the synthesis of Compound 1 was repeated except that Intermediate 6 was substituted for Intermediate 1 in the final step to thus form Compound 6 in a yield of 63%.

EXAMPLE 7

Synthesis of Compound 7

The route of synthesis of Compound 7 is as follows:

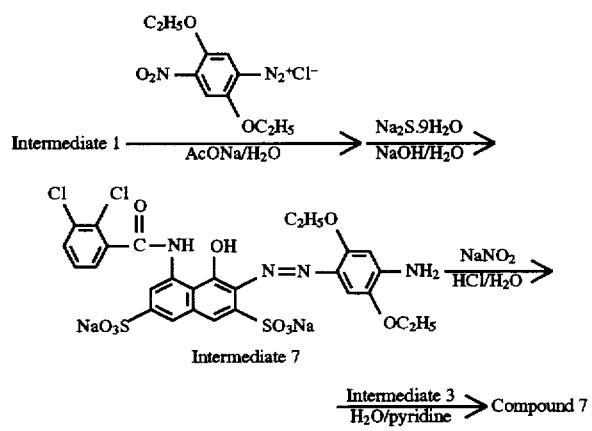

1) Synthesis of Intermediate 7

To a mixed solvent comprising deionized water (20 ml) and concentrated hydrochloric acid (5.1 ml), there was dissolved 2,5-diethoxy-4-nitroaniline (4.52 g, 20 mmol) and then a solution of sodium nitrite (1.56 g, 22 mmol) in deionized water (10 ml) with ice-cooling. The reaction mixture was stirred for 60 minutes with ice-cooling. The aqueous solution of the diazonium salt thus prepared was added to a solution of Intermediate 1 (12 g, 22.2 mmol as calculated on the basis of its disodium salt) and sodium acetate (5.5 g) in deionized water (200 ml) at 10° C. After stirring the reaction mixture at 20° C. for one hour, the temperature was raised up to 45° C. and the mixture was further stirred for additional one hour.

To the reaction mixture, there were added, in order, a 20% sodium hydroxide solution (9 ml) and sodium sulfide nonahydrate (19.2 g, 80 mmol), followed by stirring the mixture at 45° C. for one hour. After completion of the stirring operation, the reaction mixture was neutralized by the addition of acetic acid (6 ml) to thus separate out precipitates. Moreover, a saturated sodium acetate aqueous solution (40 ml) was added thereto, followed by collection of the precipitates thus formed through filtration and washing them with a 10% sodium acetate aqueous solution and then isopropyl alcohol.

The crude product of Intermediate 7 thus prepared was suspended in a mixed solvent comprising toluene (160 ml) and isopropyl alcohol (40 ml) and then vigorously stirred under reflux. After the completion of the stirring operation, precipitates thus formed were collected through filtration, followed by washing them with a mixed solvent of toluene and isopropyl alcohol (volume ratio 4:1) and drying to give 2.8 g of Intermediate 7 (yield thereof in the form of disodium salt: 19%).

2) Synthesis of Compound 7

A solution of Intermediate 7 (2.23 g, 3.0 mmol) in deionized water (50 ml) was ice-cooled, followed by addition of concentrated hydrochloric acid (1.1 ml), vigorous stirring, addition of a solution of sodium nitrite (230 mg, 3.3 mmol) in deionized water (3 ml) and stirring the mixture for 30 minutes with ice-cooling to give a diazonium salt. On the other hand, Intermediate 3 (1.93 g, 3.6 mmol) was dissolved in deionized water (40 ml), followed by addition of pyridine (18 ml) and then addition of a suspension of the diazonium salt prepared by the foregoing procedures at a temperature ranging from 10° to 15° C. The reaction mixture was stirred at room temperature for 60 minutes, then heated up to 50° C. and again stirred for additional 30 minutes. Then the reaction mixture was heated to 70° C., followed by addition of isopropyl alcohol (100 ml) and sodium acetate (25 g). After cooling the mixture down to room temperature, the precipitates thus formed were collected through filtration, followed by washing with a 10% aqueous sodium acetate solution, a mixed solvent of isopropyl alcohol and water (volume ratio 4:1) and isopropyl alcohol in this order and drying them.

The crude product of Compound 7 thus prepared was washed with 400 ml of a hot mixed solvent comprising ethanol and water (volume ratio 4:1), followed by filtration and subsequent washing with ethanol and drying to give 2.46 g (1.91 mmol, yield 64%) of Compound 7.

EXAMPLE 8

Synthesis of Compound 8

The route of synthesis of Compound 8 is as follows:

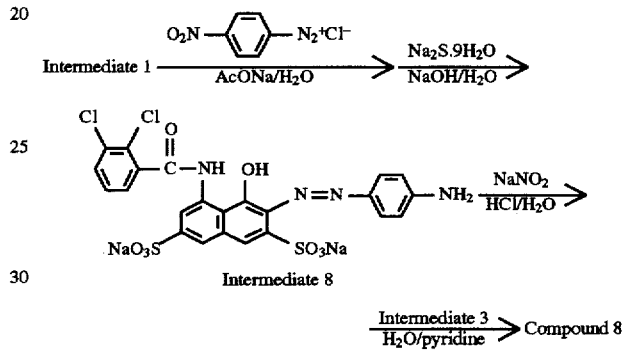

1) Synthesis of Intermediate 8

There was dissolved p-nitroaniline (4.14 g, 30 mmol) in a mixed solution of deionized water (30 ml) and concentrated hydrochloric acid (7.5 ml) and a solution of sodium nitrite (2.31 g, 33 mmol) in deionized water (15 ml) was added to the resulting solution with ice-cooling. The reaction mixture was stirred for 60 minutes with ice-cooling. An aqueous solution of the diazonium salt thus prepared was added to a solution of Intermediate 1 (17.7 g, 33 mmol as calculated on the basis of its disodium salt) and sodium acetate (9.3 g) in deionized water (270 ml) at a temperature of 10° C. After stirring the reaction mixture at 20° C. for one hour, it was heated up to 45° C., followed by stirring for additional one hour.

To the reaction mixture, there were added, in order, a 20% sodium hydroxide solution (15 ml) and sodium sulfide nonahydrate (28.8 g, 120 mmol) and the mixture was stirred at 45° C. for one hour. After the completion of the stirring, the reaction mixture was neutralized by the addition of acetic acid (10 ml) to thus separate out precipitates. After further addition of a saturated sodium acetate aqueous solution (30 ml), the precipitates thus formed were collected through filtration and then washed with isopropyl alcohol.

The crude product of Intermediate 8 thus prepared was suspended in a mixed solvent comprising toluene (200 ml) and isopropyl alcohol (50 ml) and then vigorously stirred under reflux. After the completion of the stirring, precipitates thus formed were collected through filtration, followed by washing them with a mixed solvent of toluene and isopropyl alcohol (volume ratio 4:1) and drying to give 7.3 g of Intermediate 8 (yield thereof as calculated on the basis of its disodium salt: 37%).

2) Synthesis of Compound 8

A solution of Intermediate 8 (2.62 g, 4.0 mmol) in deionized water (70 ml) was ice-cooled, followed by addition of concentrated hydrochloric acid (1.35 ml), vigorous stirring, addition of a solution of sodium nitrite (310 mg, 4.4 mmol) in deionized water (10 ml) and stirring the mixture for 30 minutes with ice-cooling to give a diazonium salt. On the other hand, Intermediate 3 (2.57 g, 4.8 mmol) was dissolved in deionized water (40 ml), followed by addition of pyridine (25 ml) and water (12 ml) and then addition of a suspension of the diazonium salt prepared by the foregoing procedures at a temperature ranging from 10° to 15° C. The reaction mixture was stirred at room temperature for 60 minutes, then heated up to 50° C. and again stirred for additional 30 minutes. Then the reaction mixture was heated to 70° C., followed by addition of isopropyl alcohol (100 ml) and sodium acetate (15 g). After cooling the mixture down to 40° C., the precipitates thus formed were collected through filtration, followed by washing with a mixed solvent of ethanol and water (4:1), ethanol and isopropyl alcohol in this order and drying to give 2.46 g of Compound 8 (1.91 mmol, 64%).

EXAMPLE 9

Synthesis of Compound 9

1) Synthesis of Intermediate 9

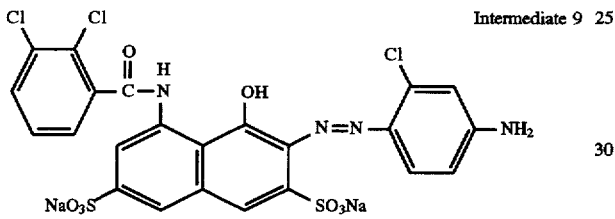

Intermediate 9

The same reaction used for the synthesis of Intermediate 2 in the process for synthesizing Compound 1 was carried out except that 2-chloro-4-nitroaniline was substituted for 2,5-dimethoxy-4-nitroaniline to thus synthesize Intermediate 9.

2) Synthesis of Compound 9

The same reaction used in the sysnthesis of Compound 8 was carried out except that Intermediate 9 was substituted for Intermediate 8 to thus give Compound 9 in a yield of 23%.

EXAMPLE 10

Synthesis of Compound 10

A solution of 2,5-dimethyl-1,4-phenylenediamine (1.36 g, 10 mmol) in deionized water (100 ml) was ice-cooled, followed by addition of concentrated hydrochloric acid (5 ml), vigorous stirring, addition of a solution of sodium nitrite (1.54 g, 22 mmol) in deionized water (10 ml) and stirring the mixture for 60 minutes with ice-cooling to give a diazonium salt. On the other hand, Intermediate 1 (14 g, 26 mmol) was dissolved in deionized water (120 ml), followed by addition of a 1N sodium hydroxide solution till the pH of the solution reached about 7, further addition of pyridine (30 ml) and water (15 ml) and then addition of a suspension of the diazonium salt prepared by the foregoing procedures at a temperature ranging from 10° C. to 15° C. The reaction mixture was stirred at room temperature for 60 minutes, then heated up to 50° C. and again stirred for additional 30 minutes. Then the reaction mixture was heated to 70° C., followed by addition of isopropyl alcohol (200 ml) and sodium acetate (20 g). After cooling the mixture down to 35° C., the precipitates thus formed were collected through filtration, followed by washing with a mixed solvent of ethanol and water (volume ratio 4:1) and then ethanol. The crude product of Compound 10 thus prepared was dissolved in 50 ml of water at 80° C. and then ethanol (200 ml) was dropwise added to the solution at 80° C. The reaction system was cooled down to 35° C., the precipitates formed were collected through filtration, washing with ethanol and drying to give 1.45 g of Compound 10 (2.3 mmol, 23%).

EXAMPLE 11

Preparation of Compound 12 by Ion-Exchange Method

Acid-type Amberlite 120B (wet volume 10 ml) was packed in a column, followed by circulation of a large excess of an aqueous solution containing L-tyrosineamide (3.8 g) through the column to thus saturate the column with L-tyrosineamide through adsorption. Compound 2 (100 mg) was passed, five times (10 minutes/passage), through this ion-exchange column and the resulting eluate was lyophilized to give 120 mg of Compound 12. The completion of the ion-exchange was confirmed by NMR and elemental analyses.

EXAMPLE 12

Preparation of Compound 11 by Ion-Exchange Method

Compound 11 was prepared by repeating the same procedures used in Example 11, i.e., ion-exchange of Compound 2, except for using an ion-exchange column packed with Amberlite 120B which had been saturated with potassium ions through adsorption.

The compounds of the present invention prepared by the foregoing methods each was dissolved in dimethylsulfoxide to a concentration of 1 mg/ml, followed by diluting the solution 100 times with pure water or PBS to prepare a solution for measurement and then each solution was subjected to determination of maximum wavelength of absorbed light and the absorbance. The results as listed in the following Table were thus obtained. The unit of $\lambda_{max}$ is nm. Moreover, the bis-azo compounds prepared by the method described above in general comprise not less than 5% by weight of water through absorption of moisture present in the air, but the foregoing absorbance is not corrected for the presence of water.

TABLE 2

| Compound No. | $\lambda_{max}$ (Absorbance) (Pure Water) | $\lambda_{max}$ (Absorbance) (PBS) |
|---|---|---|
| Compound 1 | 668 (0.388) | 668 (0.375) |
| Compound 2 | 669 (0.469) | 668 (0.461) |
| Compound 3 | 669 (0.510) | 623 (0.493) |
| Compound 4 | 669 (0.505) | 613 (0.347) |
| Compound 5 | 668 (0.448) | 667 (0.436) |
| Compound 6 | 668 (0.369) | 668 (0.356) |
| Compound 7 | 675 (0.484) | 671 (0.497) |
| Compound 8 | 653 (0.661) | 604 (0.532) |
| Compound 9 | 602 (0.356) | 603 (0.294) |
| Compound 10 | 627 (0.555) | 616 (0.469) |
| Compound 11 | 670 (0.392) | 669 (0.381) |
| Compound 12 | 670 (0.357) | 670 (0.348) |

The compounds listed below can also be prepared according to methods approximately identical to those described in Examples 1 to 12.

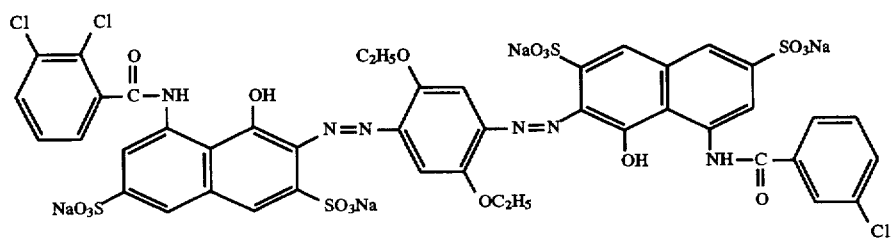
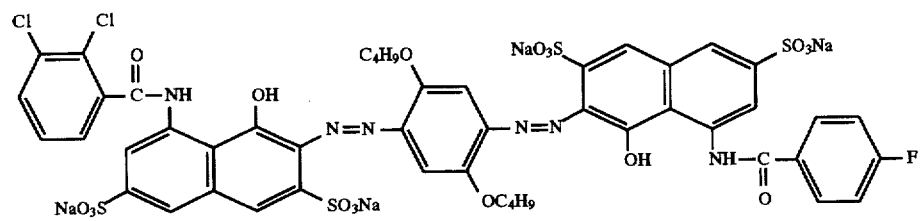
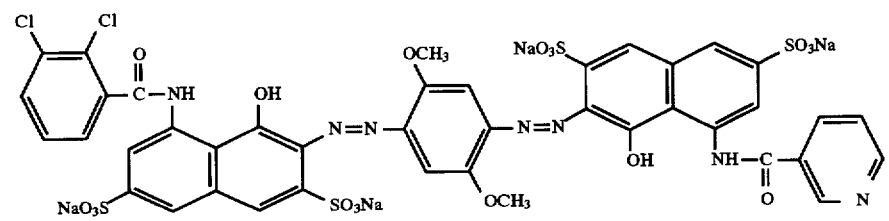
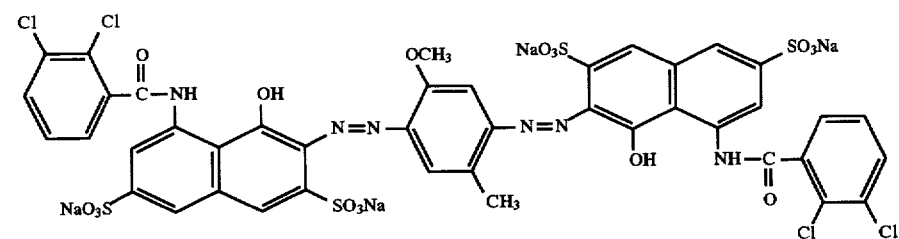
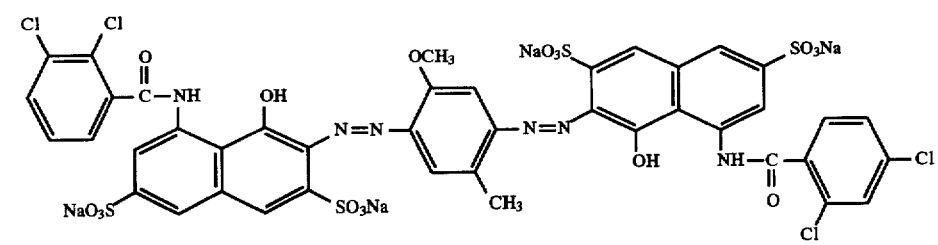
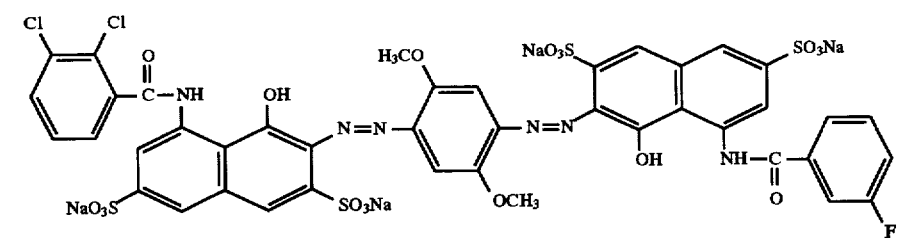
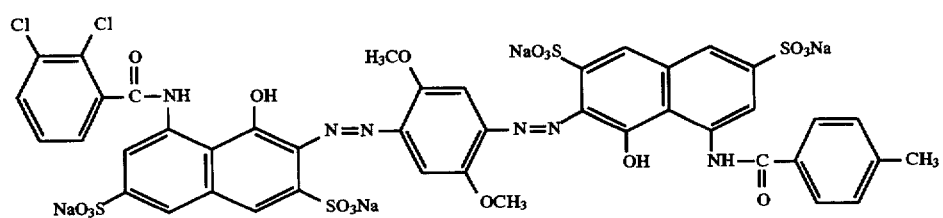

-continued
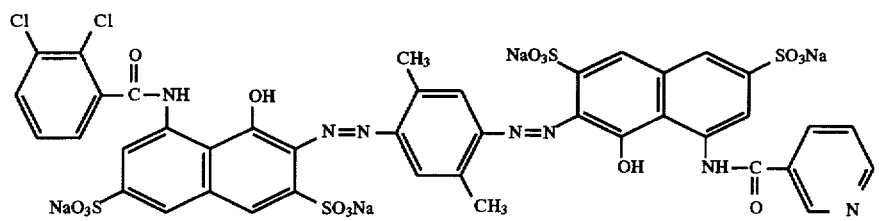
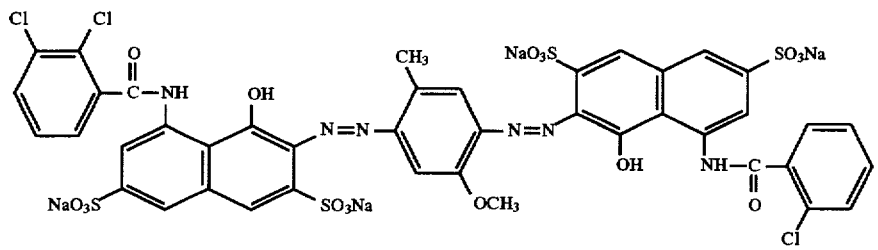
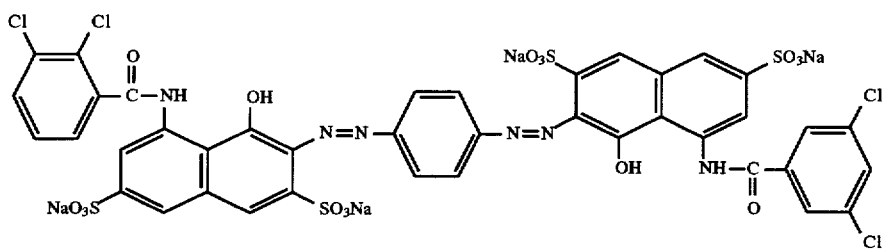
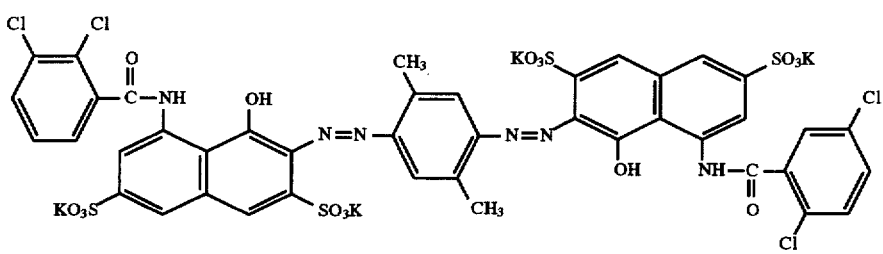
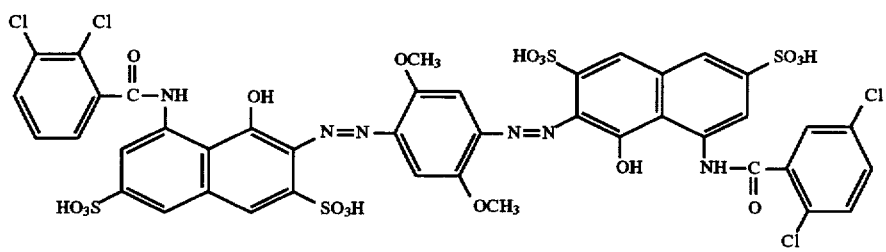
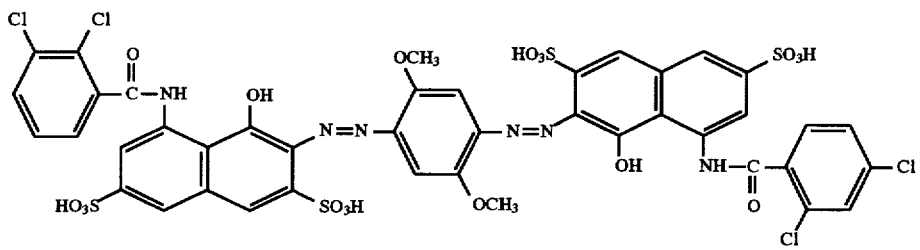

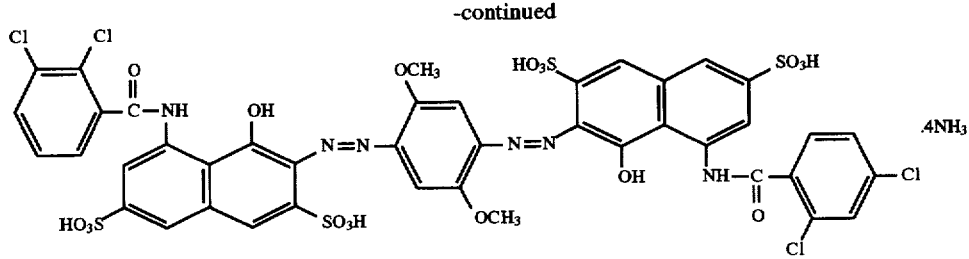

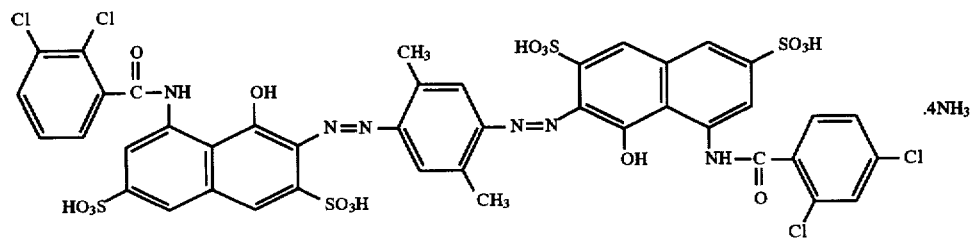

It is known that the azo dyes synthesized from enol type coupling components such as phenol, naphthol or pyrazolone comprise tautomers such as azo (enol) type and hydrazo (keto) type isomers, i.e., they undergo a phenomenon called keto-enol type tautomerism (PHOTOGRAPHIC SCIENCE AND ENGINEERING, 1976, 20, P. 155). In the present specification, such compounds have been described in the azo (enol) type forms, but the present invention also includes compounds having hydrazo (keto) tautomeric structures such as those exemplified below.

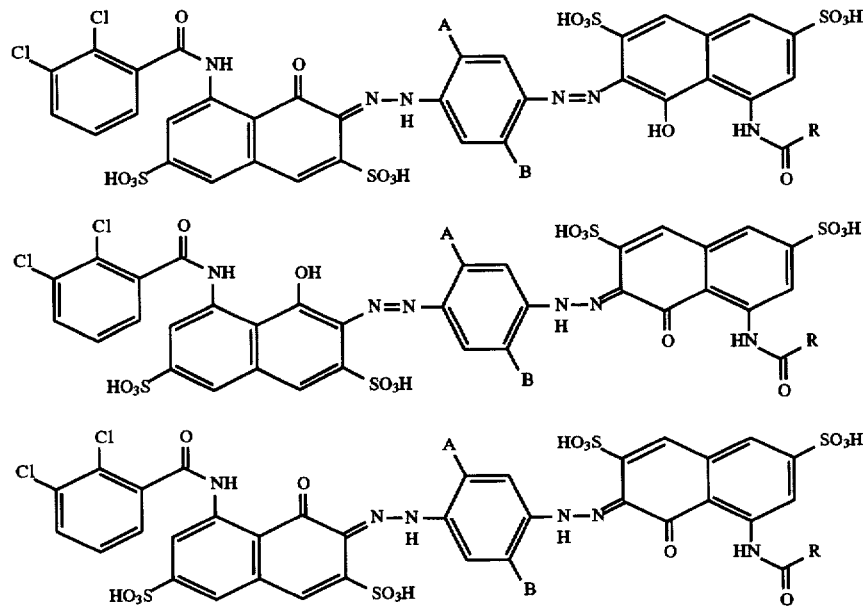

EXAMPLE 13

Mutagenicity of the Compounds of the Invention

Compounds 1 to 10 of the present invention were inspected for the mutagenicity according to the Ames Test. The Ames Test was performed using the following 6 strains: histidine-requiring *Salmonella typhimurium* strains TA 100, TA 1535, TA 98, TA 1537 and TA 1538 and tryptophane-requiring *Escherichia coli* strain WP2uvr A and carried out by the plate culture method according to the metabolism-activation method or without using the metabolism-activation method. As to the evaluation of the results, a compound is estimated to be "positive" if the number of reverse mutation colonies is increased to a level of not less than two times that observed for the negative control group and shows dose-dependency, while a compound is evaluated to be "negative" if the number of reverse mutation colonies does not reach a level of two times the latter.

As a result, all of the compounds 1 to 10 of the present invention were found to be "negative" in the Ames Test.

COMPARATIVE EXAMPLE 1

Bis-azo compounds such as those listed below as comparative compounds were also inspected for the mutagenicity by the Ames Test carried out according to the procedures disclosed in Example 13. These bis-azo compounds are ones whose N-acyl groups on 8-amino-1-hydroxynaphthalene-3,6-disulfonic acid are groups other than 2,3-dichlorobenzoyl group, unlike the compounds of the present invention.

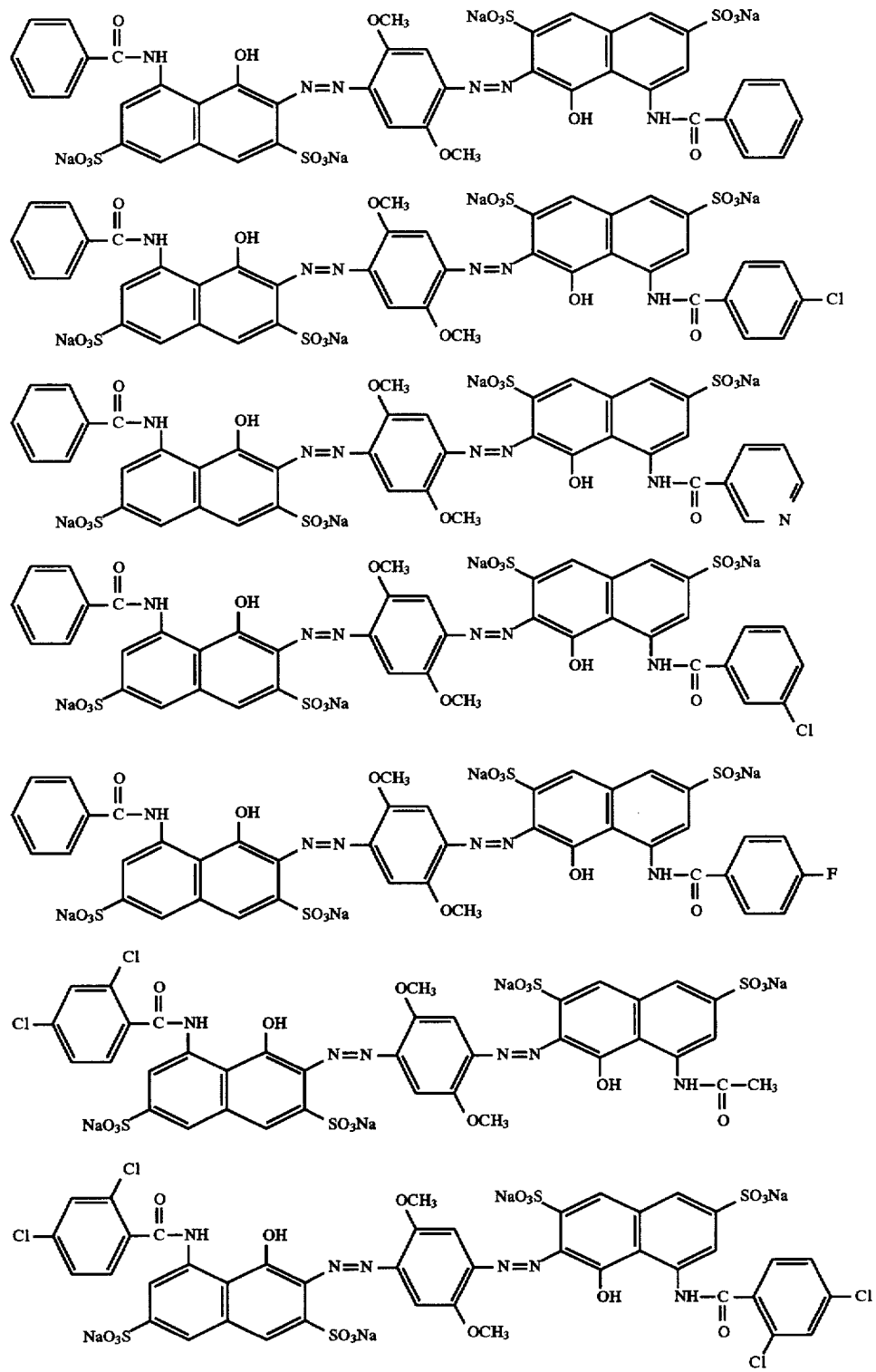

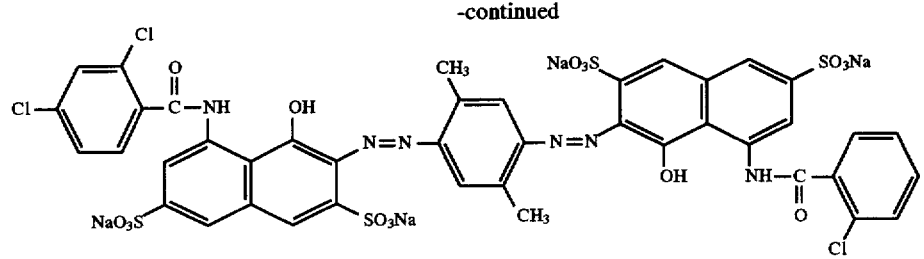

As a result of various investigations, all of the foregoing comparative compounds were found to be "positive" in the Ames Test. This clearly indicates that the bis-azo compounds of the present invention are excellent and have inventive steps.

It has been reported that the p-phenylenediamine or benzidine derivatives formed through the cleavage of the azo bonds present on the conventional bis-azo compounds by the enzymes present in living bodies become principal causes of the mutagenicity of the compounds and that the mutagenicity can be reduced due to effects of substituents on the p-phenylenediamine or benzidine ring, in particular, by the introduction of water-soluble substituents (such as sulfonate residues or carboxyl groups), according to the results of studies on the mutagenicity of the conventional bis-azo compounds. However, the result herein obtained proves such a new finding that the mutagenicity of bis-azo compounds may also be reduced by replacing at least one N-acyl group present on 8-amino-1-hydroxynaphthalene-3,6-disulfonic acid, which is quite distant from the site regarded as the major cause of the mutagenicity, with 2,3-dichlorobenzoyl group.

As has been described above, the bis-azo compounds of the present invention are highly safe compounds which are free of such undesired effects as mutagenicity. Moreover, the structures thereof are simple and therefore, they can easily be synthesized and are highly useful as dyes or the like.

We claim:

1. A bis-azo compound represented by the following formula (1), a tautomer thereof or a salt thereof:

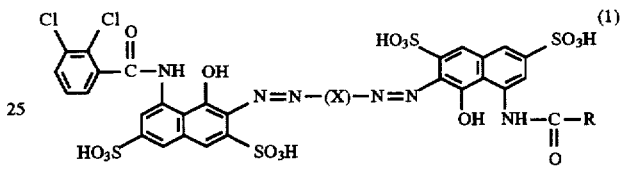

wherein R represents a substituted or unsubstituted phenyl group or a substituted or unsubstituted heteroaryl group and X represents a substituted or unsubstituted phenylene group.

2. A bis-azo compound represented by the following formula (2), a tautomer thereof or a salt thereof:

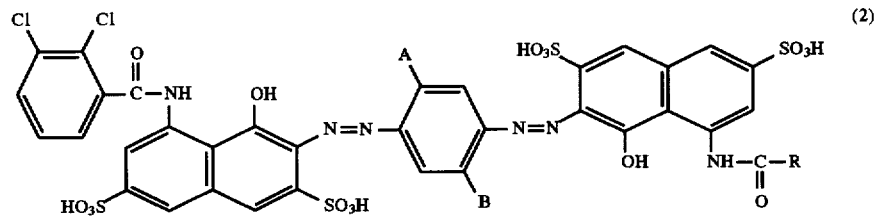

wherein R represents a substituted or unsubstituted phenyl group or a substituted or unsubstituted heteroaryl group and A and B may be the some or different and each represents a member selected from the group consisting of a hydrogen atom, an alkyl group having 1 to 4 carbon atoms, an alkoxy group having 1 to 4 carbon atoms and a halogen atom.

3. The bis-azo compound, the tautomer thereof or the salt thereof as set forth in claim 2 wherein A and B are identical to one another and each represents an alkoxy group having 1 to 4 carbon atoms.

4. The bis-azo compound, the tautomer thereof or the salt thereof as set forth in claim 2 wherein A and B are identical to one another and each represents a methoxy group.

5. The bis-azo compound, the tautomer thereof or the salt thereof as set forth in claim 4 wherein R is a phenyl group substituted with a halogen atom.

6. The bis-azo compound, the tautomer thereof or the salt thereof as set forth in claim 4 wherein R is a phenyl group substituted with a chlorine atom.

7. A bis-azo compound selected from the group consisting of compounds represented by the following formulas, a tautomer thereof or a salt thereof:

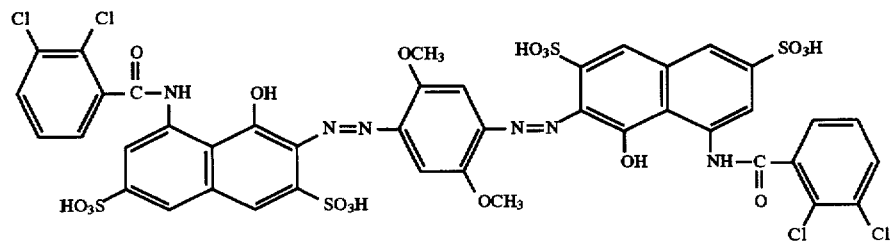

-continued
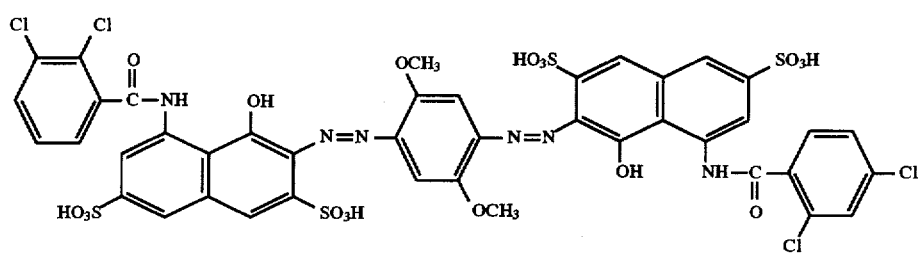
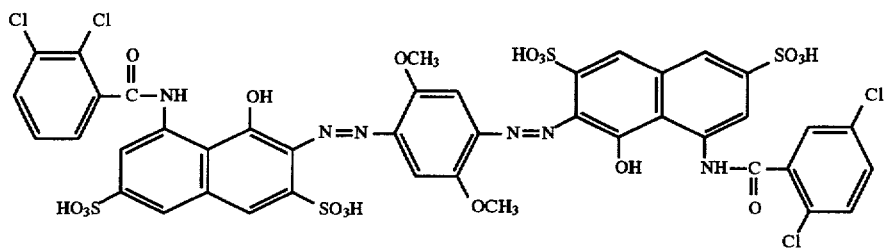
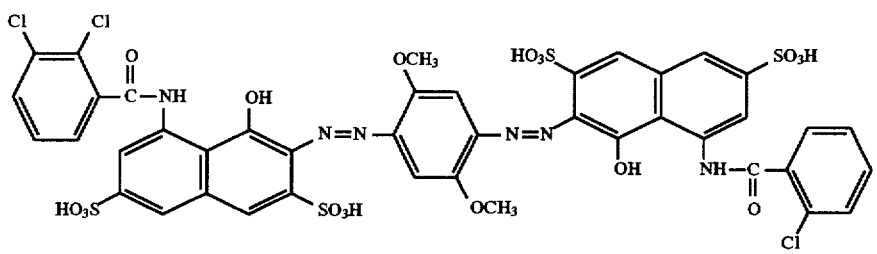
and
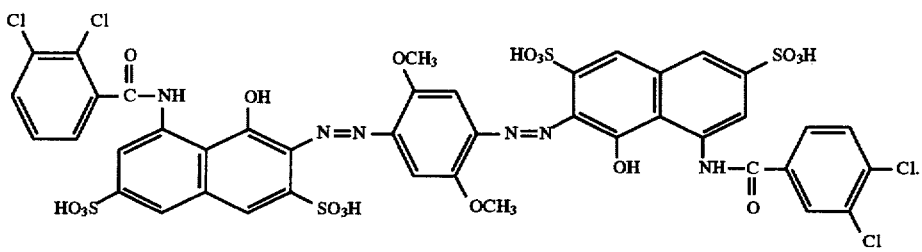
8. The bis-azo compound, the tautomer thereof or the salt thereof as set forth in claim 4 wherein R is a phenyl group of which at least one o-position is substituted with a chlorine atom.
* * * * *